(12) United States Patent
Grech

(10) Patent No.: US 8,276,218 B2
(45) Date of Patent: Oct. 2, 2012

(54) MACERATOR TOILET

(75) Inventor: George Grech, Garden City, MI (US)

(73) Assignee: Thetford Corporation, Ann Arbor, MI (US)

( * ) Notice: Subject to any disclaimer, the term of this patent is extended or adjusted under 35 U.S.C. 154(b) by 1282 days.

(21) Appl. No.: 11/697,768

(22) Filed: Apr. 9, 2007

(65) Prior Publication Data

US 2007/0240255 A1 Oct. 18, 2007

Related U.S. Application Data

(60) Provisional application No. 60/791,953, filed on Apr. 13, 2006.

(51) Int. Cl.
*E03D 9/10* (2006.01)
(52) U.S. Cl. .............................. 4/319; 4/320; 241/46.17
(58) Field of Classification Search .............. 4/319, 320; 241/46.17, 46.013
See application file for complete search history.

(56) References Cited

U.S. PATENT DOCUMENTS

| | | | |
|---|---|---|---|
| 3,323,650 A * | 6/1967 | Kilbane, Jr. .................. 210/173 |
| 3,432,108 A * | 3/1969 | Enright ..................... 241/46.016 |
| 3,878,569 A * | 4/1975 | Peirish et al. .............. 241/101.2 |
| 5,022,098 A * | 6/1991 | Brower ............................. 4/233 |
| 6,408,448 B1 | 6/2002 | Jermier |
| 6,421,843 B1 | 7/2002 | Mellinger et al. |
| 2004/0129807 A1 | 7/2004 | Phillips et al. |

FOREIGN PATENT DOCUMENTS

| EP | 1 464 764 A | 10/2004 |
| EP | 1 605 108 A | 12/2005 |
| EP | 1 845 209 A1 | 12/2007 |

OTHER PUBLICATIONS

European Search Report for App. No. EP 07 00 7469.

\* cited by examiner

*Primary Examiner* — William Gilbert
*Assistant Examiner* — Patrick Maestri
(74) *Attorney, Agent, or Firm* — Harness, Dickey & Pierce, P.L.C.

(57) ABSTRACT

A macerator toilet comprising a toilet body include a bowl portion and a base portion, the base portion defining a chamber and a macerator unit in fluid communication with the bowl portion, the macerator unit completely disposed in the chamber and operative for macerating a waste received from the bowl unit and pump the waste from the macerator toilet.

16 Claims, 8 Drawing Sheets

MACERATOR TOILET

CROSS-REFERENCE TO RELATED APPLICATIONS

This application claims priority to U.S. Provisional Patent Application No. 60/791,953 filed 13 Apr. 2006, which application is herein expressly incorporated by reference.

INTRODUCTION

The present invention relates to waste management systems. More particularly, the present invention relates to macerator toilets.

DISCUSSION

Various types of toilets are known. In most known domestic toilets, flush water is routed directly to a drain in the floor and then to a sewage system or septic tank. Where the toilet is incorporated into a vehicle, such as a recreational vehicle, airplane, boat, train or the like, most conventional toilets route the flush water directly to an on-board holding tank.

To a more limited extent, known toilets may incorporate a macerator. Such macerator toilets appear very much like conventional toilets and operate in the same manner. Rather than routing the flush water directly to a sewage system, septic tank or holding tank, however, flush water is routed to a macerator pump. The macerator pump is typically located in a small box that may be located on the floor between the toilet and a wall. Similar to a garbage disposal, the macerator uses fast-rotating cutting blades to substantially liquefy human waste, toilet paper and other similar materials in the flush water. The slurry produced by the macerator may be discharged under pressure through a discharge line to the sewage system, septic or holding tank.

Macerating toilets advantageously permit installation that is completely above a floor. In this manner, costly excavation of the floor to install a drain line may be avoided.

While known macerator toilets may have proven acceptable for their intended applications, there remains a need for continuous improvement in the pertinent art.

SUMMARY

According to one aspect, the present teachings provide a macerator toilet comprising a toilet body including a bowl portion and a base portion, the base portion defining a chamber and a macerator unit in fluid communication with the bowl portion, the macerator unit completely disposed in the chamber and operative for macerating a waste received from the bowl unit and pumping the waste from the macerator toilet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF VARIOUS ASPECTS

Figure 1:
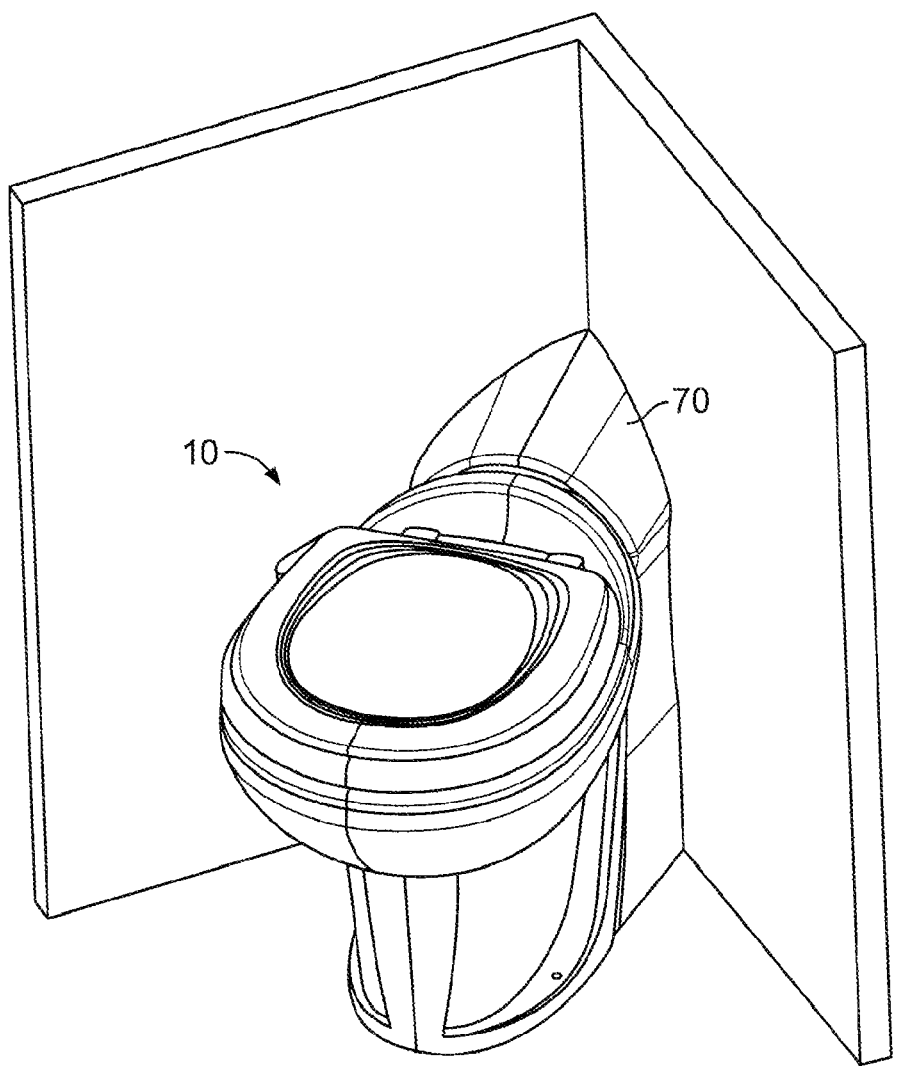
FIG. 1 is a front perspective view of a macerator toilet constructed in accordance with the present teachings, the macerator toilet shown operatively associated with a shroud for mounting of the macerator toilet proximate a corner.

The following description of the present teachings will be considered to be merely exemplary in nature and is in no way intended to limit the invention, its application, or uses.

With reference generally the drawings, a macerator toilet constructed according to the teachings of the present disclosure is illustrated and generally identified at reference character 10. In one particular application, the macerator toilet 10 is intended for use within a motor vehicle such as a recreational vehicle, boat or the like. After a reading of the remainder of this detailed description, however, those skilled in the art will readily appreciate that the present teachings are so not limited. Rather, the various teachings herein will be understood to have applicability to both vehicle and non-vehicle applications.

As will be more appreciated below, the macerator toilet 10 of the present teachings provides a reduced foot print and an overall appearance substantially identical to a conventional flush toilet without a macerator. In this regard, various teachings of the present invention allow the entire system to be contained within a conventionally shaped base without the need for an independent macerator box. Additionally, various teachings of the present invention cooperate to provide an extremely low water usage unit.

The macerator toilet 10 of the present teachings is illustrated as a high rise toilet. The macerator toilet 10 may be unitarily formed to include a bowl portion 12 and a base portion 14. Alternatively, the macerator toilet 10 can be constructed as a low rise toilet that is mounted on a platform. The bowl portion 12 may be constructed of a vitreous china. In certain applications, it may be desirable to construct the bowl and the base portions 12 and 14 of distinct materials. For example, the bowl portion 12 may be constructed of a vitreous china and the base portion 14 may be constructed of a plastic.

Figure 3:
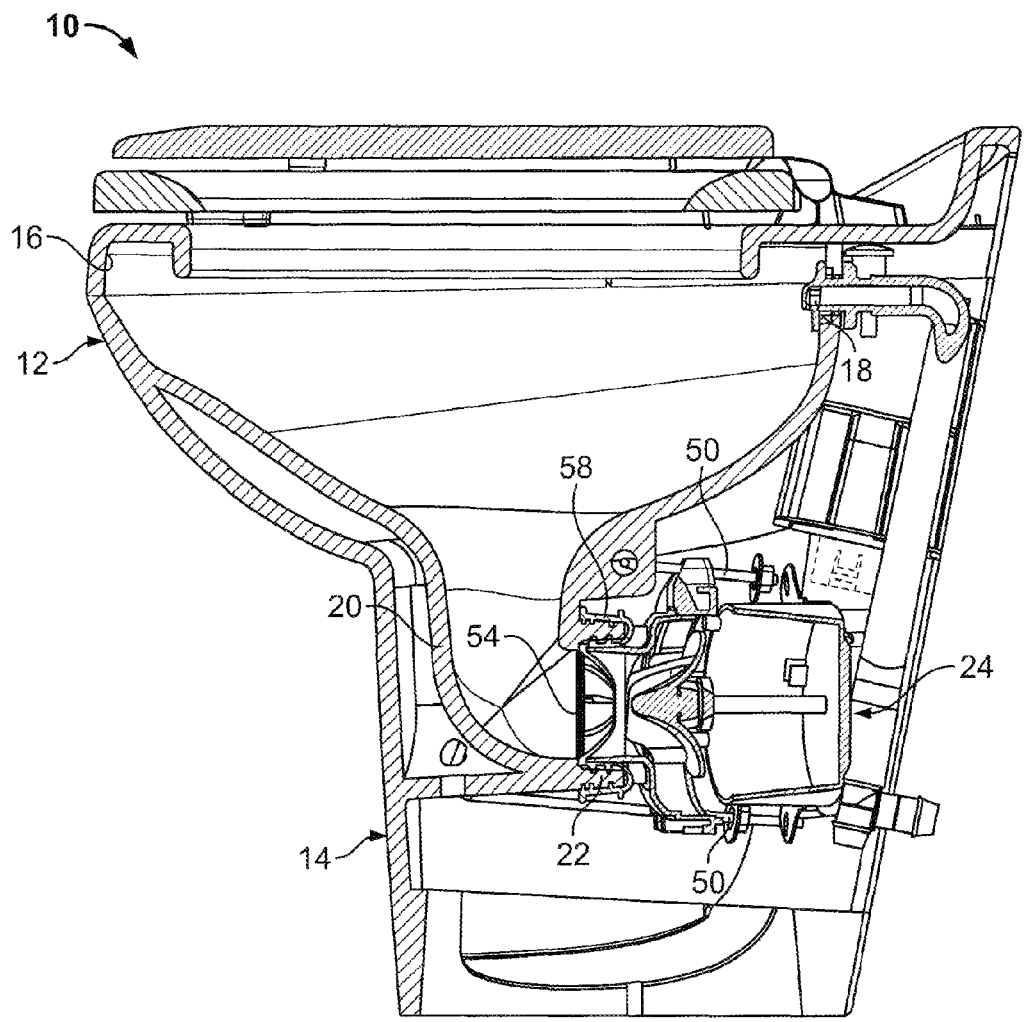
FIG. 3 is a cross-sectional view taken along the line 3-3 of FIG. 2.
Figure 4:
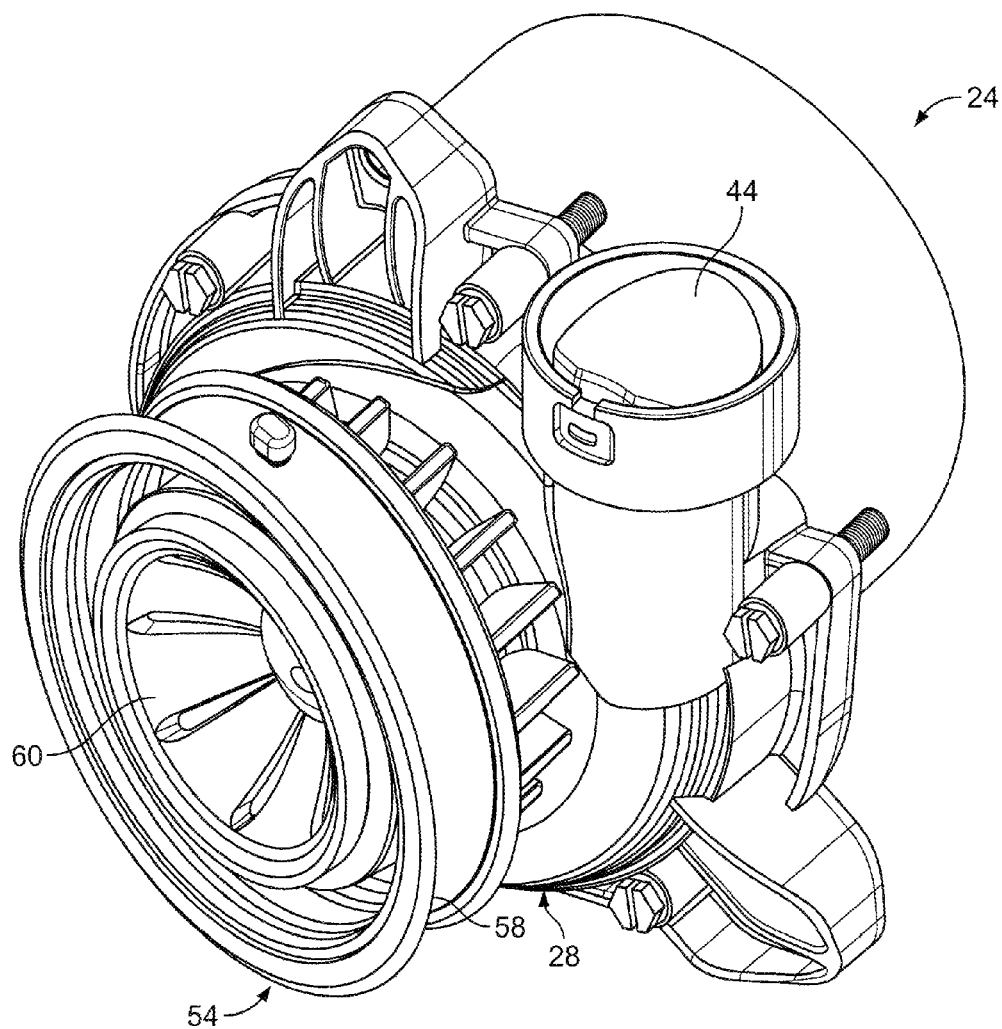
FIG. 4 is a perspective view of the macerator assembly of the toilet of FIG. 1.
Figure 5:
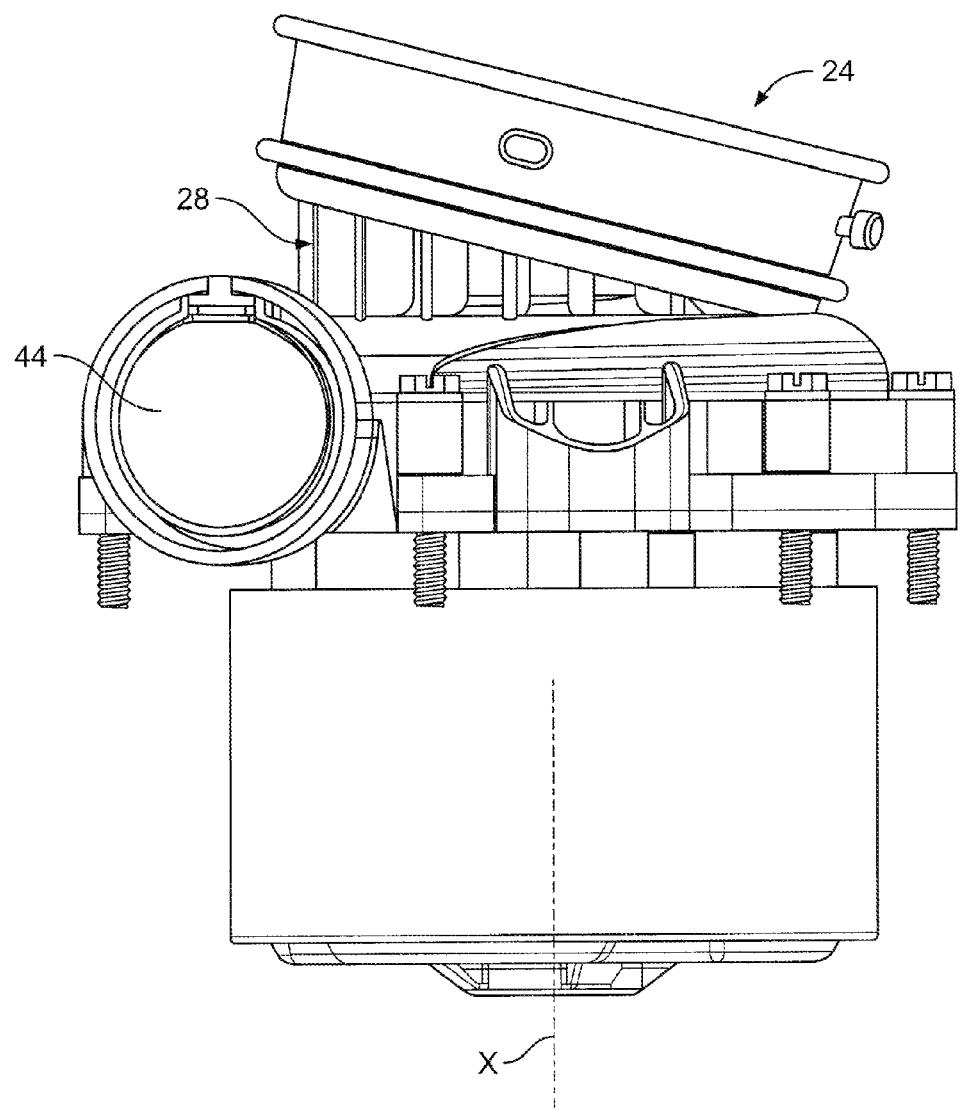
FIG. 5 is a top view of the macerator assembly of FIG. 4.
Figure 6:
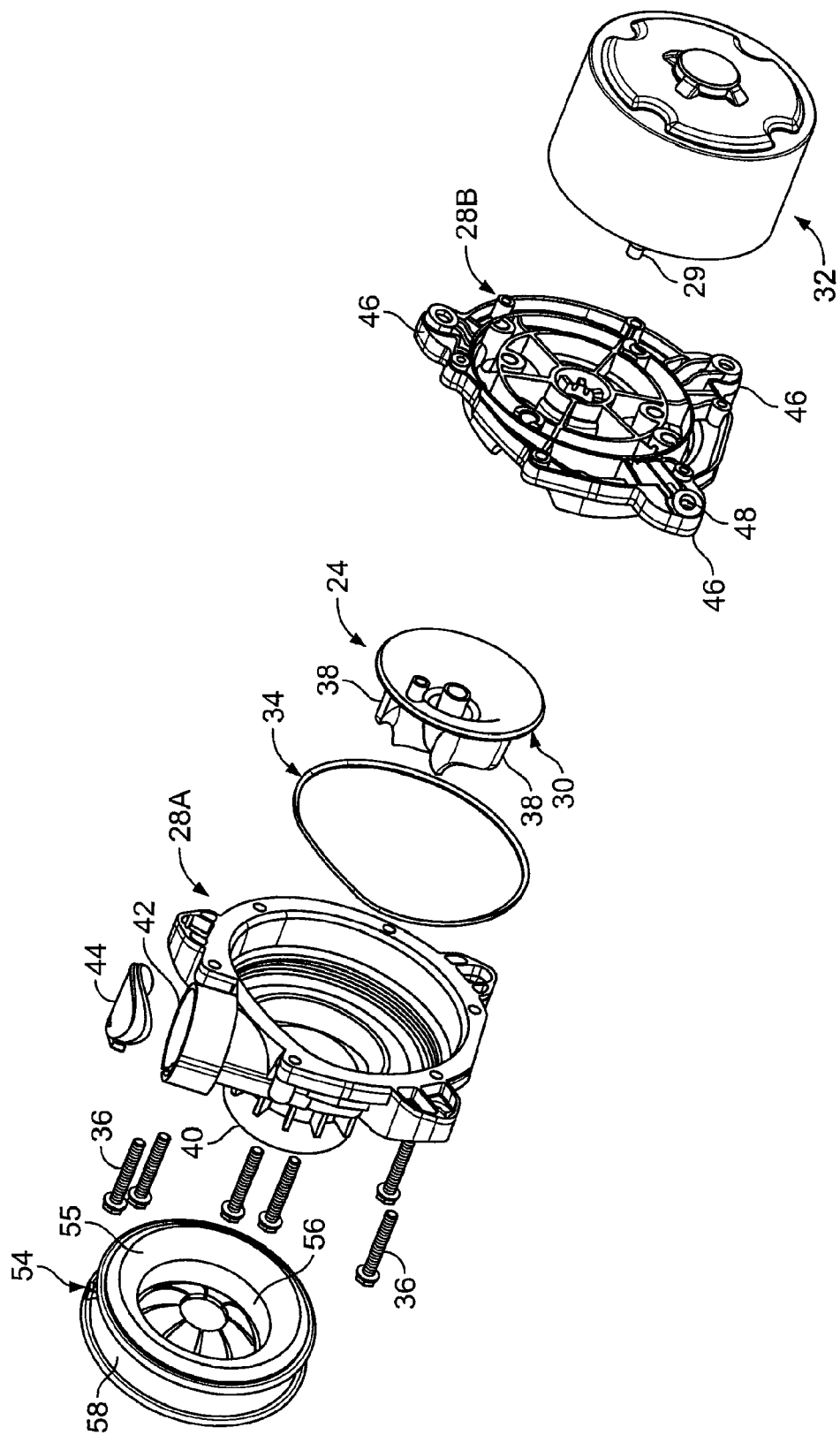
FIG. 6 is an exploded view of the macerator assembly of FIG. 4.
Figure 7:
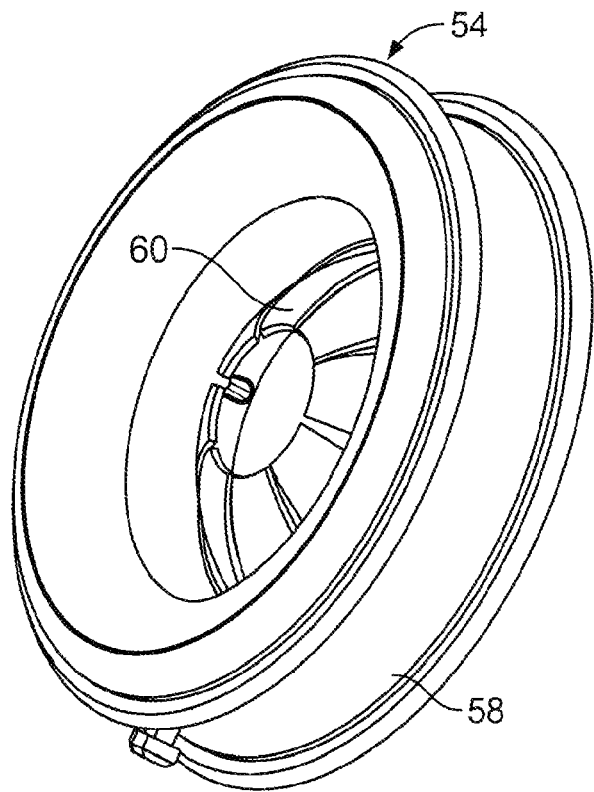
FIG. 7 is a perspective view of a seal member of the macerator assembly of FIG. 4.
Figure 8:
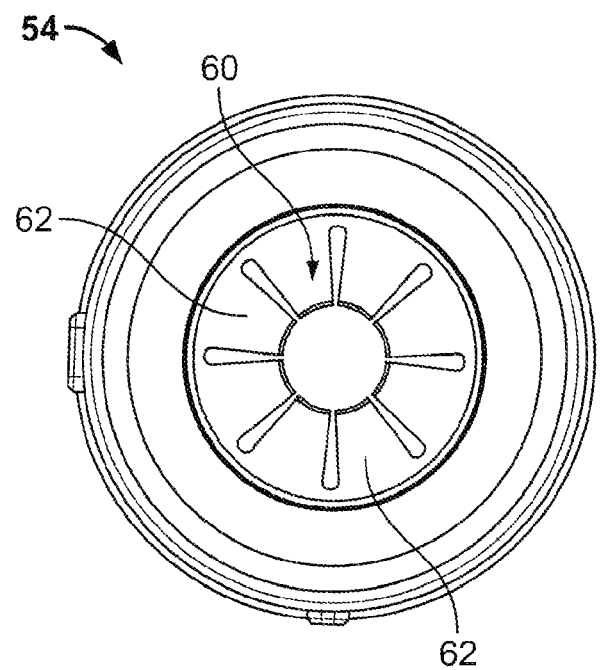
FIG. 8 is a front view of the seal member of FIG. 7.

As perhaps shown most clearly in the cross-sectional view of FIG. 3, the bowl portion 12 of the macerator toilet 10 may include an open rim 16 and a flush nozzle 18 positioned proximate a rear portion of the open rim 16. The bowl portion 12 may additionally include a bottom discharge outflow 20. The entry to the bottom discharge outflow 20 may be positioned centrally within the bowl portion 12. The bottom discharge outflow 20 may include a rearwardly extending portion 22. As will be appreciated further below, the rearwardly extending portion 22 may be substantially cylindrical in configuration and provide a mounting portion for coupling to a macerator unit 24. The bottom discharge outflow 20 may be unitarily formed with the remainder of the bowl portion 12 of vitreous china.

The base portion 14 may support the bowl portion 12 and define a chamber 26 for housing the macerator unit 24. In the high rise version of the macerator toilet 10 shown in the drawings, the base portion 14 may downwardly extend beyond the bottom discharge outflow 20. In alternative applications, the base portion 14 may terminate below the bottom discharge outflow 20.

With particular reference to FIGS. 4 through 8, the macerator unit 24 is further illustrated. The macerator unit 24 may generally include a housing 28, an impeller pump 30 and a motor 32. The housing 28 may include a first housing portion 28A and a second housing portion 28B. The first and second housing portions 28A and 28B may cooperate to define a chamber in which the impeller pump 30 is disposed. A seal 34 may be captured between the first and second housing portions 28A and 28B so that the chamber is fluid tight.

The first and second housing portions 28A and 28B may be secured to one another with a plurality of fasteners 36. In this regard, the first housing portion 28A may define a plurality of boss portions with apertures for receiving the fasteners 36. The second housing portion 28B may define aligning apertures for receiving the fasteners 36. The fasteners 36 may be threadably received by the second housing portion 28B or may alternatively pass through the second housing portion 28B and engage nuts.

The first housing portion 28A defines an input port 40 (see FIG. 6, for example) and an output port 42. The input port 40 may extend at an angle to a longitudinal axis X (see FIG. 5) of the macerator unit 24. The angle may be between approximately 10 and 30 degrees and may further assist in reducing the footprint of the toilet 10. The input port 40 may be in fluid engagement with the chamber defined by the first and second housing portions 28A and 28B and may thereby function to deliver waste to the impeller pump 30 disposed in the chamber.

Figure 2:
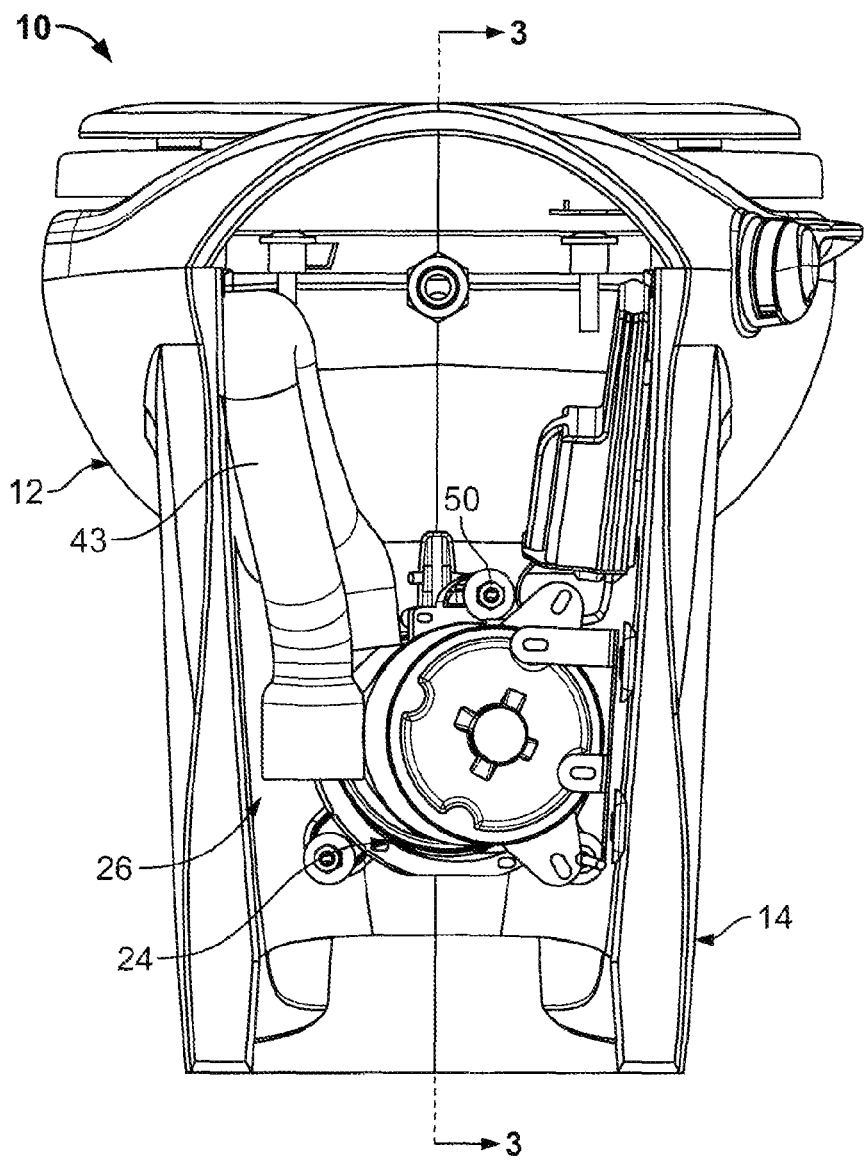
FIG. 2 is a rear view of the macerator toilet of FIG. 1.

The output port 42 may similarly be in fluid communication with the chamber defined between the first and second housing portions 28A and 28B. As illustrated, the output port 42 may upwardly extend relative to the remainder of the housing 28. The output port 42 may carry a one-way seal 44 which presents minimal intrusion in the waste path while precluding waste from returning to the macerator unit 24. A suitable one-way seal 44 is further described in commonly assigned U.S. Publication No. 2007/0240772 A1 entitled "In-Line, One-Way Valve Assembly" filed contemporaneously herewith. U.S. Publication No. 2007/0240772 A1 is hereby incorporated by reference as if fully set forth herein. The output port 42 may be coupled to a discharge hose 43 (see FIG. 2) for delivering the macerated waste to a holding tank, a sewage system or a septic tank.

The second housing portion 28B may include a plurality of mounting portions 46 to facilitate secure attachment of the macerator unit 24 to the toilet 10. In this regard, the second housing portion 28B may include a plurality of radially extending tabs 46. As illustrated, the plurality of radially extending tabs 46 may include three radially extending tabs 46. The tabs 46 may define apertures 48 for receiving fasteners 50 (see FIG. 3). The fasteners 50 may engage mounting portions 52 (again, see FIG. 3) formed with the toilet 10.

The impeller pump 30 may be rotatably coupled to an output shaft 29 of the motor 32. The motor 32 may be secured to the first housing portion 28B with fasteners (not particularly shown). The impeller pump 30 may include plurality of blades 38 for conventionally macerating the waste. The plurality of blades 38 may further function in a conventional manner to direct macerated waste out the discharge port 42.

The macerator unit 24 may be secured to the bottom discharge outflow 20 in a fluid tight manner with a seal member 54. The seal member 54 may be constructed of rubber or other suitable materials having the requisite strength, flexibility and durability. The seal member 54 may include a main body 55 (see FIG. 6) that is generally cylindrical in shape and defines an inner circumferential surface 56 (see FIG. 6) for receiving the input port 40 of the housing 28. The seal member 54 may additionally include an outer circumferential flange 58 interconnected to the main body 55. As perhaps shown most clearly in the cross-sectional view of FIG. 3, the rearwardly extending portion 22 of the bottom discharge outflow 20 may be captured between the circumferential flange 58 and the main body 55. The flexible nature of the seal member 54 may permit mounting to the toilet 10 and the macerator unit 24 without discrete clamps and thereby reduce part count and associated labor.

The seal member 54 may additionally include a diaphragm 60. The diaphragm 60 may be unitarily constructed of rubber with the remainder of the seal member 54 and may include a plurality of radially extending tabs 62. The tabs 62 may be configured to extend toward the housing 28. The diaphragm 60 may provide surge protection for the macerator unit 24. In this regard, the tabs 62 may easily flex outwardly to allow waste to pass from the bottom discharge outflow 20 to the macerator unit 24 through an enlarged opening. Conversely, the configuration of the tabs 62 may prevent a surge of waste from returning from the macerator unit 24 to the bottom discharge outflow 20.

With reference to the environmental view of FIG. 1, the toilet 10 may be used with a shroud 70. The shroud 70 may function to aesthetically interconnect the toilet 10 with one or more walls 72. As shown in FIG. 1, the shroud 70 may be particularly adapted to aesthetically interconnect the toilet 10 with a corner.

Figure 9:
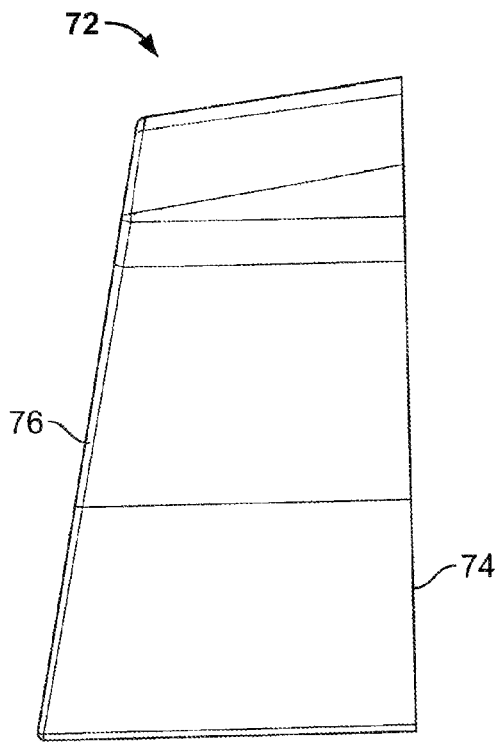
FIGS. 9 through 11 illustrate another shroud for adapting a toilet to a planar wall in accordance with the present teachings.
Figure 10:
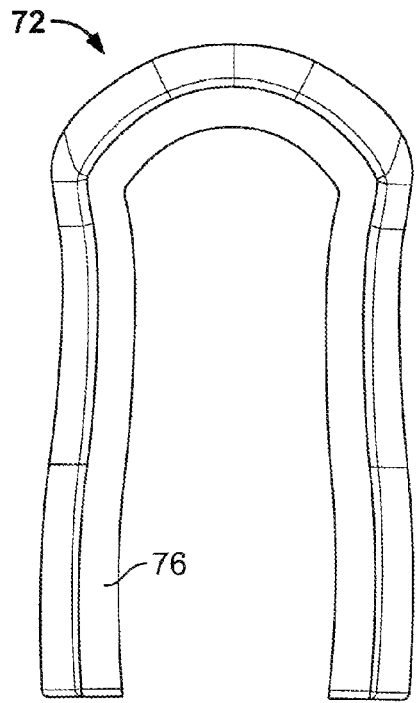
Figure 11:
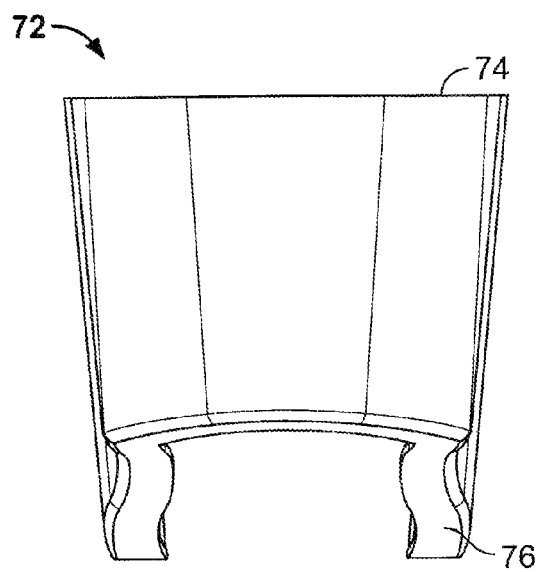

An alternate shroud 72 is shown in more detail in FIGS. 9 through 10. It will be understood that the shroud 72 may be identical to the shroud 70 with the exception that the shroud 72 defines a generally planar rear surface 74 for abutting a single wall. A front surface 76 of the shroud 72 can be configured to matingly engage the toilet 10.

The description of the present disclosure is merely exemplary in nature and, thus, variations that do not depart from the gist of the invention are intended to be within the scope of the invention. Such variations are not to be regarded as a departure from the spirit and scope of the invention. Furthermore, the present disclosure has been described with reference to various features. One skilled in the art will recognize that these features may be used singularly or in any combination based on the requirements and specifications of a given application or design.

What is claimed is:

1. A macerator toilet comprising:
   a toilet body including a bowl portion and a base portion, the base portion defining a chamber; and
   a macerator unit in fluid communication with the bowl portion, the macerator unit horizontally oriented, completely disposed in the chamber and operative for macerating a waste received from the bowl unit and pumping the waste from the macerator toilet;
   wherein the macerator unit is coupled to the toilet body with one or more fasteners, the one or more fasteners including a hook portion engaging an aperture defined by the toilet body and a shaft passing through an aperture of the macerator unit.

2. The macerator toilet of claim 1, wherein:
the bowl portion includes a downwardly extending outflow having a rearwardly extending portion, the rearwardly extending portion defining a generally cylindrical horizontally extending tube.

3. The macerator toilet of claim 2, wherein:
the bowl portion defines a bowl, the downwardly extending outflow opening to the bowl at approximately a center of the bowl.

4. The macerator toilet of claim 2, wherein:
the macerator unit is coupled to the generally cylindrical horizontally extending tube with a seal member.

5. The macerator toilet of claim 2, wherein:
the seal member includes a generally cylindrical portion received within the generally cylindrical horizontally extending tube.

6. The macerator toilet of claim 5, wherein:
the seal member further includes a circumferential flange circumferentially surrounding an outside of the tube.

7. The macerator toilet of claim 6, wherein:
the macerator unit defines a longitudinally extending axis and an inlet port of the macerator unit is oriented at an angle of approximately 10° to 30° relative to the longitudinal axis.

8. The macerator toilet of claim 1, wherein:
the seal member includes a generally cylindrical portion received within the horizontally extending tube and the surge protector includes a plurality of radially extending members radially extending from the cylindrical portion.

9. The macerator toilet of claim 1, wherein the macerator unit is at least substantially disposed below the bowl portion.

10. The macerator toilet of claim 1, wherein the aperture is defined by the toilet body and engaging the hook portion is spaced above a portion of the outflow.

11. The macerator toilet of claim 1, wherein at least a substantial portion of the macerator unit is disposed between first and second imaginary vertical lines, the first imaginary vertical line at a forward end of the bowl portion and the second imaginary vertical line at a rear end of the bowl portion.

12. The macerator toilet of claim 2, wherein a substantial portion of the macerator is positioned above a lower portion of the rearwardly extending portion of the downwardly extending outflow.

13. The macerator toilet of claim 11, wherein the rearwardly extending portion of the downwardly extending outflow is completely positioned between the first and second imaginary vertical lines.

14. A macerator toilet comprising:
a toilet body including a bowl portion and a base portion, the base portion defining a chamber, the bowl portion including a downwardly extending outflow; and
a macerator unit in fluid communication with the bowl portion, the macerator unit is horizontally oriented, completely disposed in the chamber and operative for macerating a waste received from the bowl unit and pumping the waste from the macerator toilet;
wherein the macerator unit is coupled to the toilet body with one or more fasteners, the one or more fasteners including a hook portion engaging an aperture defined by the toilet body and a shaft passing through an aperture of the macerator unit, the aperture of the toilet body being upwardly spaced from a portion of the outflow and extending in a direction perpendicular to the shaft.

15. The macerator toilet of claim 14, wherein the macerator is supported in a cantilevered fashion by the one or more fasteners.

16. The macerator toilet of claim 14, wherein the one or more fasteners non-threadably engage the toilet body.

* * * * *